United States Patent
Wolin et al.

[11] Patent Number: 6,158,917
[45] Date of Patent: Dec. 12, 2000

[54] RETENTION MECHANISM FOR MOUNTING PINS

[76] Inventors: Robert H. Wolin, 11121 Upper Previtali Rd.; William E. Wolin, 10368 Argonaut Dr., both of Jackson, Calif. 95642

[21] Appl. No.: 09/255,482

[22] Filed: Feb. 23, 1999

[51] Int. Cl.[7] .................................................. E02F 9/28
[52] U.S. Cl. ...................... 403/319; 403/154; 403/355; 37/456; 37/458
[58] Field of Search .................................. 403/155, 154, 403/161, 150, 319, 318, 355; 414/723; 37/468, 403, 903, 904, 456, 458, 459

[56] References Cited

U.S. PATENT DOCUMENTS

| | | | |
|---|---|---|---|
| 639,337 | 12/1899 | Anthony | 403/155 |
| 2,967,726 | 1/1961 | Weston | 287/100 |
| 3,070,390 | 12/1962 | Schroter et al. | 403/355 X |
| 3,606,406 | 9/1971 | Walters | 287/20 |
| 3,625,554 | 12/1971 | Mottais | 403/318 |
| 3,797,949 | 3/1974 | Petros | 403/355 |
| 4,096,957 | 6/1978 | Iverson et al. | 403/154 X |
| 4,337,614 | 7/1982 | Briscoe | 59/86 |
| 4,597,499 | 7/1986 | Hanula | 403/154 X |
| 5,233,770 | 8/1993 | Robinson | 37/456 |
| 5,367,798 | 11/1994 | Hughes | 37/399 |
| 5,370,474 | 12/1994 | Olson | 403/319 X |
| 5,577,858 | 11/1996 | Kasim et al. | 403/316 |
| 5,724,756 | 3/1998 | Gale | 37/458 |
| 5,791,809 | 8/1998 | Bessey | 403/348 |
| 5,927,665 | 7/1999 | Grabnic | 414/723 X |
| 5,983,534 | 11/1999 | Robinson et al. | 37/459 |

*Primary Examiner*—Lynne H. Browne
*Assistant Examiner*—David E. Bochna
*Attorney, Agent, or Firm*—L. E. Carnahan

[57] ABSTRACT

A pin retention mechanism which prevents longitudinal and/or rotational movement of a mounting pin, such as used for attaching a heavy equipment tool, which provides quick and easy removal. The pin retention mechanism comprises a housing having an opening in which an end of a mounting pin is adapted to be located, and a removable member which is inserted into the housing adjacent the end of the pin. The removable member may be provided with a protruding section which is adapted to extend through a groove in the end of the pin for preventing rotation thereof. The removable member is retained in the housing by a spring catch. In each embodiment, a safety cap screw can be utilized to eliminate movement of the removable member.

17 Claims, 4 Drawing Sheets

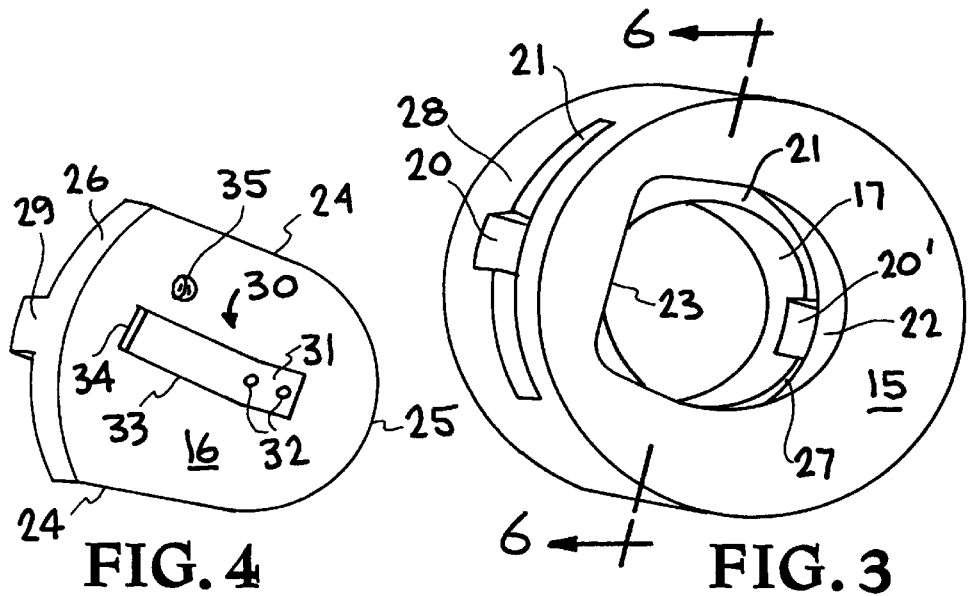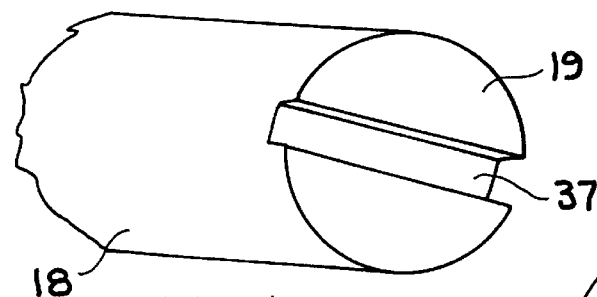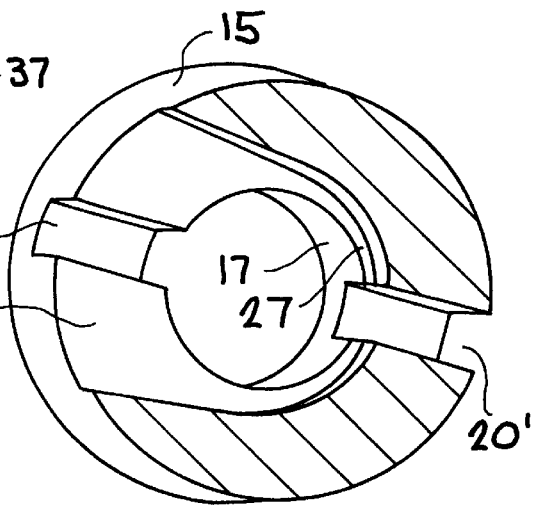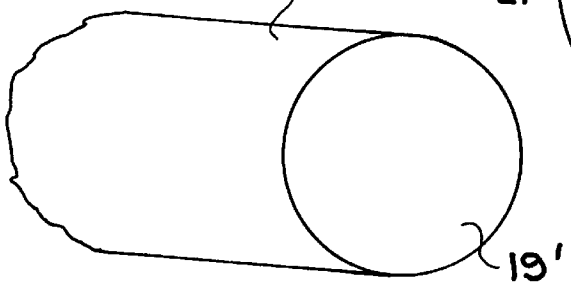

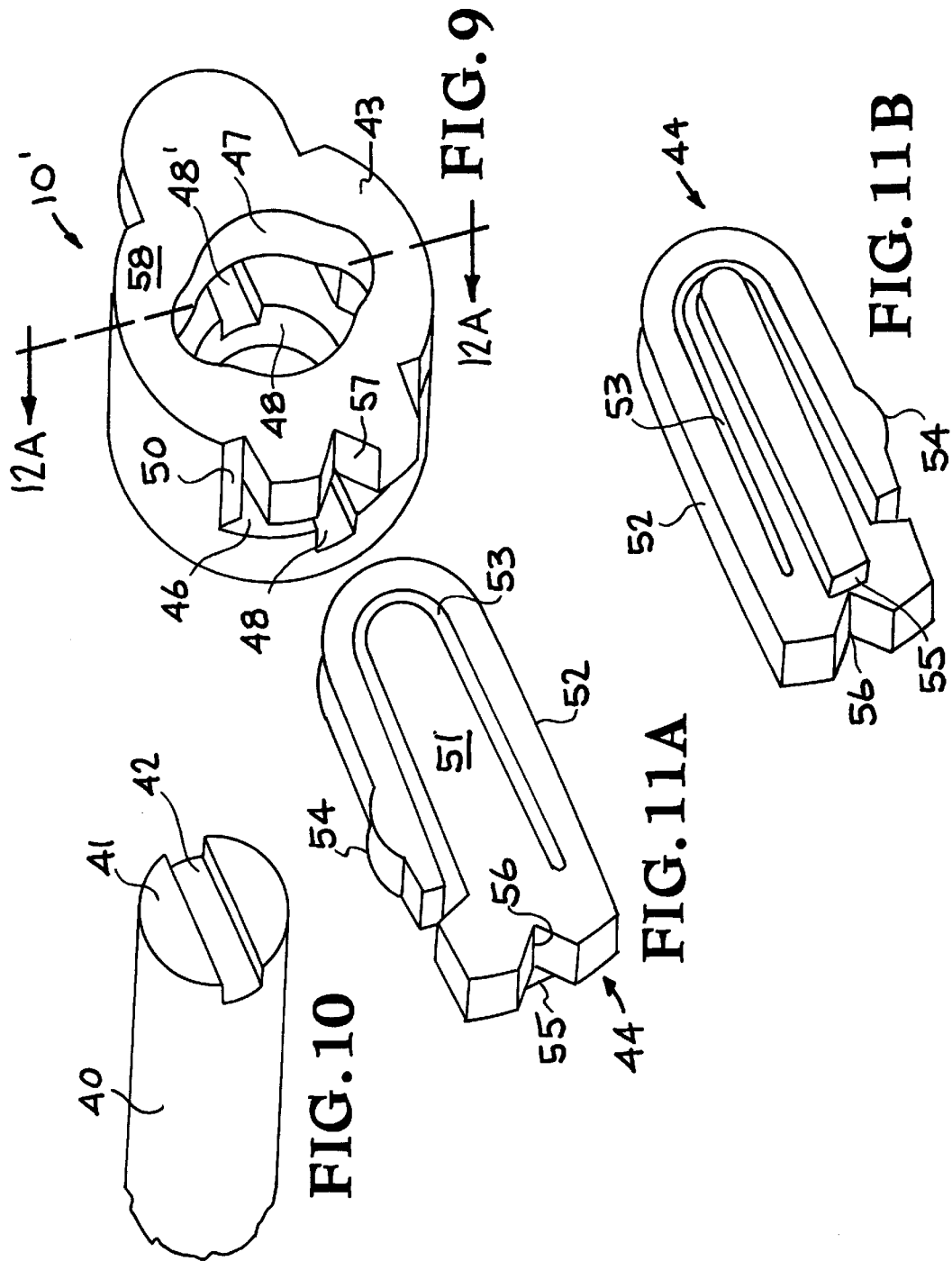

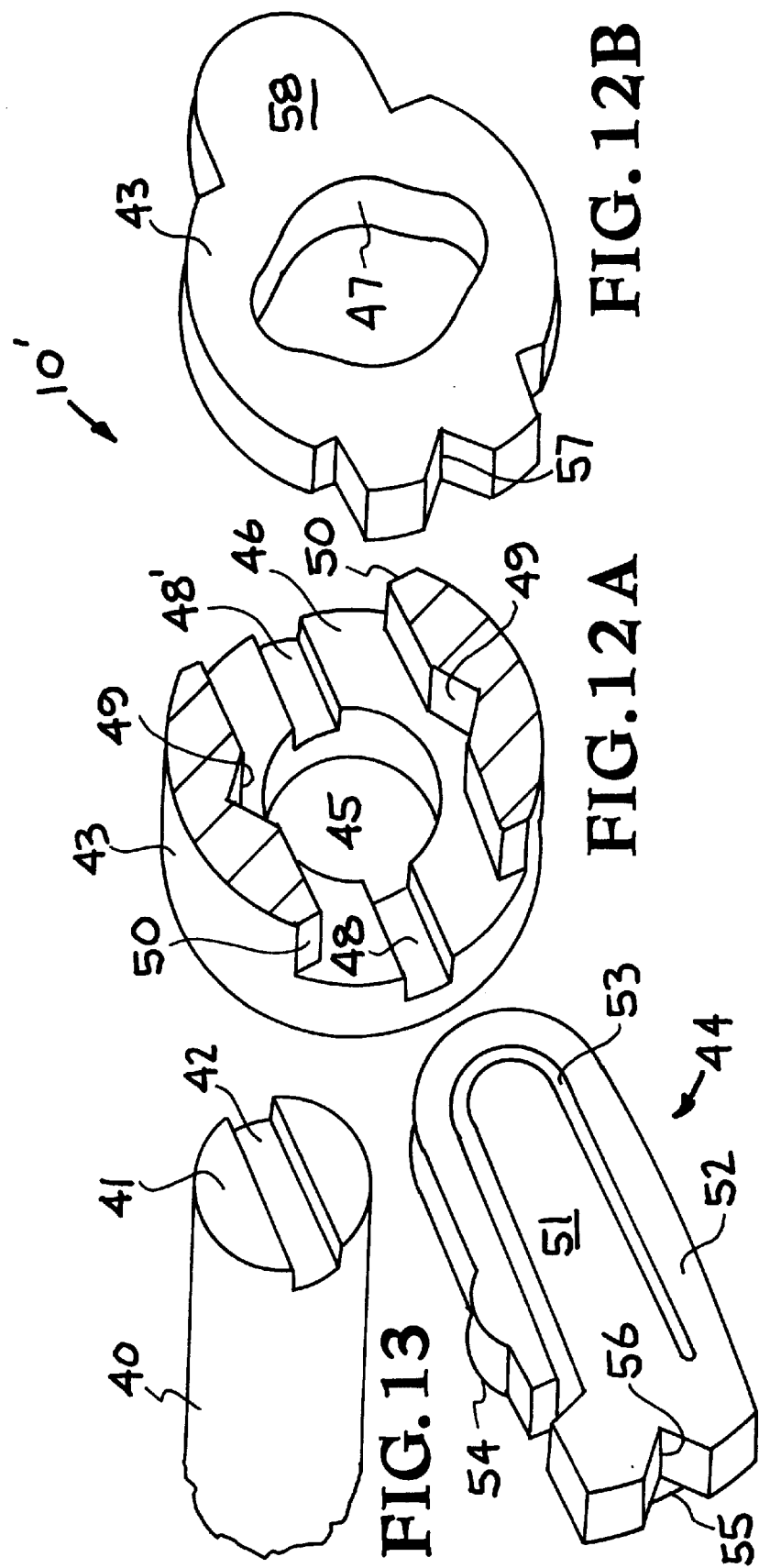

RETENTION MECHANISM FOR MOUNTING PINS

BACKGROUND OF THE INVENTION

The present invention relates to pin retention mechanisms, particularly to retention mechanisms for mounting pins on heavy equipment attachments, and more particularly to retention mechanisms for preventing longitudinal and/or rotationable movement of a mounting pin, but which can be quickly removed to enable removal of the mounting pin.

Mounting pins, which have lengths from a few inches to a few feet, have long been used to pivotably interconnect members, such as attachments for heavy equipment. One or more mounting pins are used, for example, to pivotably interconnect relatively large lever arms, such as booms of a tractor, backhoe, etc., with attachments such as loaders, buckets, etc. In many types of heavy equipment for example, different types of attachments or tools are interchangeably utilized for different applications, and thus require removal and replacement of the mounting pins (short shafts) which are typically retained by a retaining mechanism at one or both ends of the mounting pins. In some applications, the mounting pins are designed to rotate in support mechanisms, such as a bushing, and thus the retaining or securing mechanism needs only to prevent longitudinal movement such that the mounting pins will not move out of the bushing. In other applications, it is desirable to prevent rotational movement as well as longitudinal movement of the mounting pins. In all applications, it is desirable to enable quick release of the mounting pins for removal or exchange of a tool on a boom, for example, or to replace worn mounting pins. Over the years, various types of mounting pins and retaining or securing mechanisms have been developed for various types of equipment or applications. The prior known approaches are exemplified by U.S. Pat. Nos. 2,967,726, 3,606,406, 4,337,614, 5,367,798, 5,577,858, and 5,791,809. While these prior approaches have provided satisfactory mounting pin retention, there has been a long felt need, particularly in the field of heavy equipment, for amounting pin retention mechanisms which can prevent longitudinal and/or rotation movement of the mounting pins by quick installation and release mechanisms.

The present invention provides a solution to the above-referenced long felt need by providing a mounting pin retaining mechanism which can prevent longitudinal movement and/or rotation of mounting pins, at one or both ends, and which can be quickly installed and easily removed. The retention mechanism of the present invention utilizes a housing having an opening through which a mounting pin is inserted and in which an end of a mounting pin is adapted to be located, and the housing is provided with a transversely located slot into which a removable member is inserted to prevent longitudinal movement of the mounting pin. In applications where prevention of rotational movement of the mounting pin is desired, the mounting pin is provided with a groove in the end thereof and the removable member is provided with a protruding area adapted to be located in the groove of the mounting pin. The removable member is retained in the transverse slot in the housing by a spring catch arrangement, and in one embodiment a cap screw extends through the removable member to provide additional movement prevention of the removable member.

SUMMARY OF THE INVENTION

It is an object of the present invention to provide a retention mechanism for mounting pins.

A further object of the invention is to provide a mounting pin retention mechanism which prevents longitudinal and/or rotational movement of a mounting pin.

Another object of the invention is to provide a mounting pin retention mechanism which is easily installed and quickly removed.

Another object of the invention is to provide a retention mechanism for mounting pins which include a removable member having a spring catch.

Another object of the invention is to provide a retention mechanism for mounting pins having a housing with an opening and a transverse slot therein, and a removable member adapted to be retained in said slot and block passage of a mounting pin through the opening, said removable member being retained by a spring catch to enable quick removal from the slot of the removable member.

Other objects and advantages of the present invention will become apparent from the following description and accompanying drawings. Basically, the invention involves a mechanism for preventing longitudinal and/or rotational movement of a mounting pin, such as used for pivotable attachment of a tool (bucket) to a piece of equipment (backhoe). The retention mechanism includes a housing having an opening through which a mounting pin passes for placement within an apparatus, the housing includes a slot which is transverse to the opening and extends at least through the opening, a removable member is positioned in the slot so as to block passage through the opening, and the removable member is retained in the slot by a spring catch which enables quick removal of the removable member. In applications where rotational movement of the mounting pin is also desired, an end of the mounting pin is provided with a groove, and the removable member is provided with a protruding area which fits into the groove of the mounting pin. If desired, the same removable member can be used for either rotational prevention or longitudinal movement prevention of a mounting pin, in which case if longitudinal movement only was desired, a shortened mounting pin (shortened by the depth of the groove at the end thereof) may be used wherein the end of the mounting pin butts the protruding area of the removable member. In addition, to ensure that the spring retained removable member is not dislodged during use, a removable cap screw may be inserted through the removable member to prevent it from moving in the slot in the housing. The retention mechanism may be located at both ends of a mounting pin, or only at one end, depending on the type of mounting pin support structure being utilized in the apparatus utilizing mounting pins.

BRIEF DESCRIPTION OF THE DRAWINGS

The accompanying drawings, which are incorporated into and form a part of the disclosure, illustrate embodiments of the invention and, together with the description, serve to explain the principles of the invention.

FIGS. 3–5 illustrate the separate components of the retention mechanism of FIG. 2.

FIG. 6 is a cross-sectional view taken along the line 6—6 of FIG. 3 showing the slot and groove within the housing of FIG. 3 in which the removable member (FIG. 4) is positioned.

FIGS. 7 and 8 illustrate end sections of mounting pins which can be utilized with the retention mechanism of FIG. 2.

FIGS. 9, 10, 11A and 11B illustrate another embodiment of a retention mechanism made in accordance with the present invention, with FIG. 11B showing the opposite side of the removable member of FIG. 11A.

FIGS. 12A, 12B, 13 and 14 illustrate the same embodiment as FIGS. 9–11B, but with FIGS. 12A and 12B showing an exploded cross-section of the housing into which the mounting pin (FIG. 13) and the removable member (FIG. 14) extend.

DETAILED DESCRIPTION OF THE INVENTION

The present invention relates to a retention mechanisms for mounting pins, such as utilized for pivotal attachment of a tool to a piece of heavy equipment (e.g., a bucket to a backhoe). The use of mounting pins and retainer mechanisms therefor enable the removal and/or interchange of different types of tools to a single piece of equipment, thus expanding the use capability of the equipment. Since mounting pins are used in various applications from heavy equipment use to light equipment, the size, construction, and strength of the retention mechanisms may vary so as to withstand the particularly rugged use to which some heavy equipment is involved. Regardless of the application or the size of the equipment involved, it is desirable to have mounting pin retention mechanisms which are easy to install and which can be quickly removed.

The illustrated embodiments of the present invention provide a retention mechanism in FIGS. 1–8 which is particularly adapted for heavy equipment applications, while the embodiment of FIGS. 9–14 may be effectively utilized for lighter type equipment application. The components of these embodiments may be constructed of materials compatible with the intended use thereof. Each embodiment uses a removable member which is retained in a housing by a spring catch arrangement which allows for quick release of the removable member. The removable member is constructed to function for the prevention of longitudinal and/or rotational movement of the associated mounting pin. The retention mechanism of the present invention may be initially manufactured on the equipment or may be mounted on the equipment as an after-market device.

The retention mechanisms of the present invention basically comprises two parts of which only one part has a single movable member (the spring catch). In one embodiment, an additional safety cap screw may be utilized to assure that the movable member cannot be accidentally removed by accidental release of the spring catch.

Figure 1:
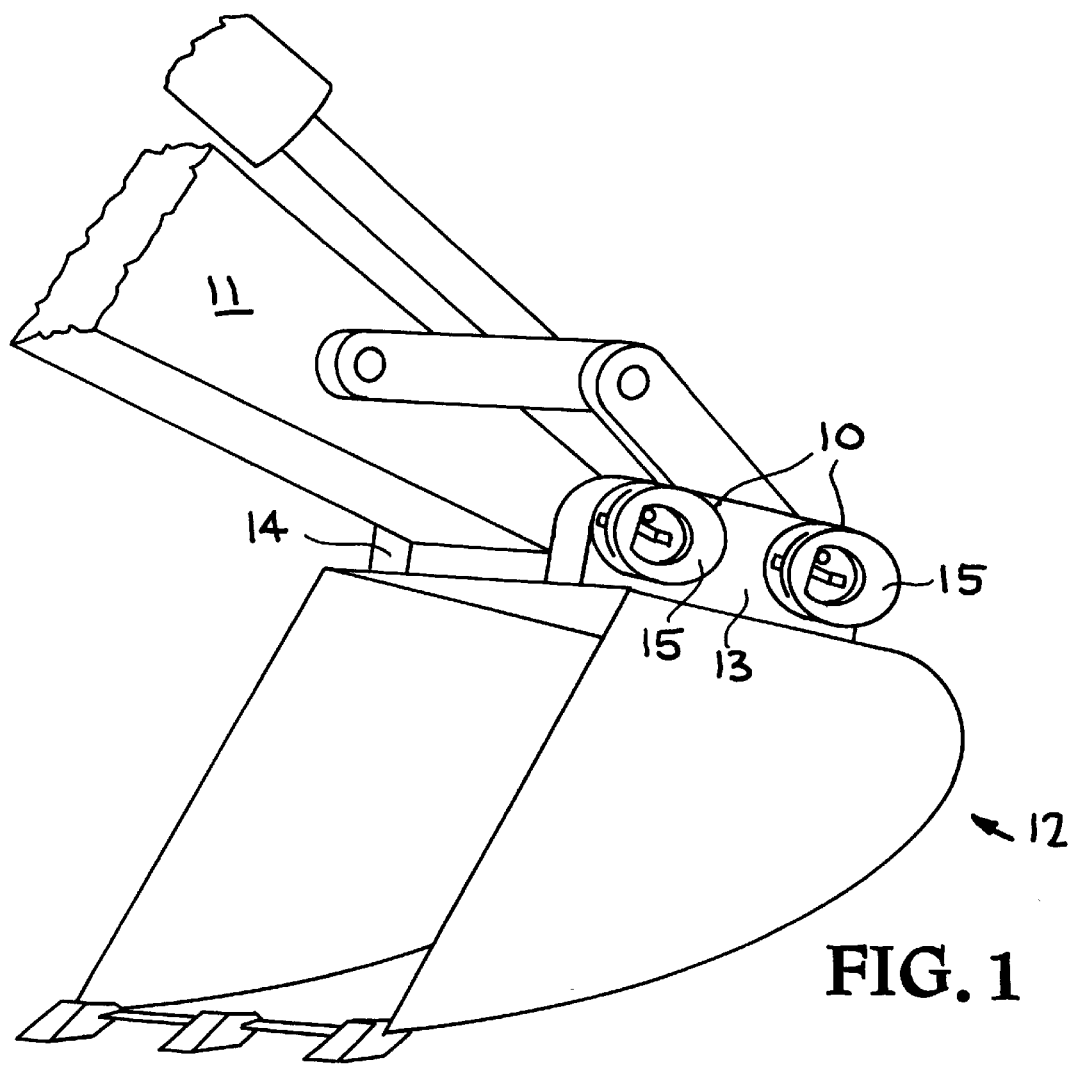
FIG. 1 is a partial view of a backhoe utilizing a pair of mounting pins with a retention mechanism for each pin made in accordance with the present invention.

Referring now to the drawings, FIG. 1 illustrates a pair of retention mechanisms, generally indicated at 10, of the present invention mounted at ends of a pair of mounting pins (not shown) by which a backhoe boom 11 is pivotably connected to a backhoe attachment (bucket) 12. The attachment 12 includes a pair of spaced support members 13 and 14 to which the retention mechanisms 10 are secured, as by welding, with the mounting pins extending through the boom 11 and into the support members 13 and 14. In certain applications, the support member 14 may include a countersink and a bushing therein into which an end of a mounting pin extends, whereby only one retention mechanism per mounting pin is required, or support member 14 may have openings therethrough, as in the case of support member 13, and a pair of retention mechanisms 10 secured about the openings, whereby the mounting pins can be inserted or removed from either side of the attachment 12 via the retention mechanisms 10.

Figure 2:
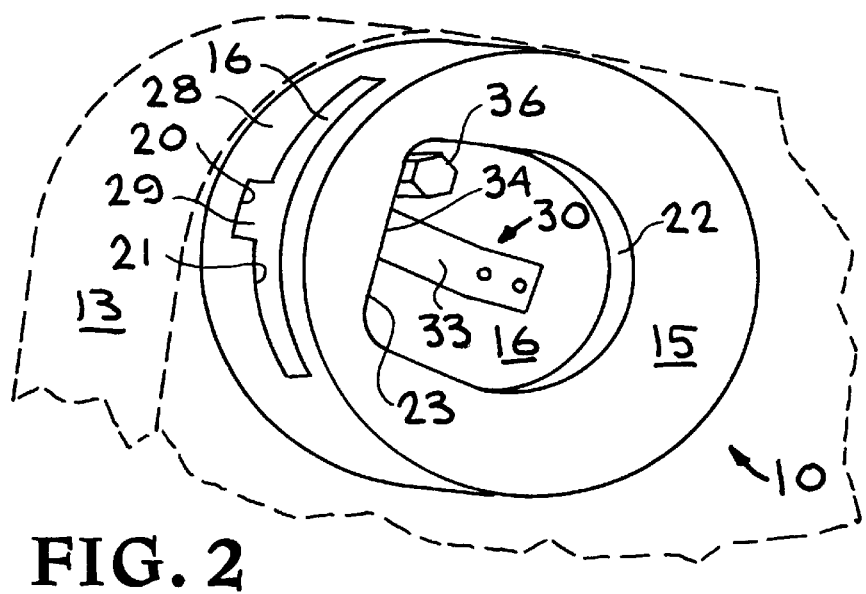
FIG. 2 is an enlarged view of a mounting pin retention mechanism of FIG. 1.

One of the retention mechanisms 10 of FIG. 1 is shown enlarged in FIG. 2, the components thereof being illustrated individually in FIGS. 3–5, with FIG. 6 being a cross-sectional view of FIG. 3. In this embodiment, ends of mounting pins, as shown in FIGS. 7 and 8, extend through boom 11 and support members 13–14 of FIG. 1 into a housing 15 of retention mechanisms 10, and the mounting pins are of a length compatible with the mounting arrangement on that attachment 12 of FIG. 1. As described hereinafter, the mounting pins may be constructed to rotate freely within support members 13–14 and housing 15, but cannot move longitudinally in that they abut against a removable member 16 of retention mechanisms 10. Also, as described hereinafter, the removable member 16 may function to also prevent rotation of an associated mounting pin, and in such case the end of the mounting pin is grooved to cooperate with a projecting area of the removable member 16.

As shown in FIGS. 3 and 6, the housing 15 is provided with a annular opening 17 through which a mounting pin 18 or 18' of FIGS. 7 and 8 passes for insertion into the support members 13–14 and boom 11 of FIG. 1, with an end 19 or 19' of mounting pins 18 or 18' being located in a section of opening 17 adjacent a groove 20–20' in housing 15 (see FIG. 6 for clarity) which extends transversely to the axis of opening 17. In this embodiment, the groove 20' extends through the housing for simplicity of fabrication, and functions as an opening for a tool to remove the removable member 16 from housing 15. Housing 15 is also provided with a tapered slot 21 which extends transversely across opening 17 with the groove 20–20' being located centrally and adjacent to slot 21, as seen more clearly in FIG. 6. Slot 21 may taper in width, as shown, and if desired, taper in thickness. Housing 15 is also provided with an elongated opening 22 that terminates at slot 21 and includes a flat surface or edge area 23. Housing 15, while shown as a single piece, may be constructed of two sections, one in which elongated opening 22 is formed, the other in which annular opening 17, groove 20–20' and tapered slot 21 is formed, with the two sections then being secured together, as by welding.

Removable member 16, as seen in FIG. 4, includes tapered sides 24 and a pair of curved end surfaces 25 and 26, the curvature of end surface 25 being configured to cooperate with the inner curvature of slot 21, indicated at 27, see FIG. 6, and the curvature of end surface 26 being configured to match the curvature of the outer wall of housing 15, as indicated at 28. As pointed out above, with respect to slot 21, the member 16 may also be tapered in thickness along the length thereof. Removable member 16 includes a protruding section 29 which extends along the length of the member 16 and is constructed to cooperate with the groove 20–20' in housing 15. In addition, a spring catch 30 has a section 31 secured to a face surface of removable member 16, as by spot welding or screws, indicated at 32, and has an outwardly extending section 33 having a flat end 34. In addition, the removable member 16 is provided with a threaded opening 35 into which a cap screw 36, see FIG. 5, is threadedly inserted.

In operation of the retention mechanism 10 of FIGS. 1–6, with a mounting pin having an end section 18 or 18' of FIGS. 7 and 8 inserted through the housing 15 and the ends 19 or 19' of mounting pins 18 and 18' located in the annular opening 17 of housing 15, the removable member 16 is inserted into slot 21 of housing 15 such that the protruding section 29 of member 16 moves through grooves 20–20' in housing 15. In applications where prevention of rotation of the mounting pin is desired, in addition to longitudinal movement prevention, a mounting pin 18 (FIG. 7) having a groove 37 in end 19' will be utilized, whereby the protruding section 29 of member 16 extends into groove 37 of pin 18 thereby preventing rotation of the mounting pin. In applications where the mounting pin may rotate freely but longitudinal movement of the pin is prevented, a mounting pin, such as pin 18' of FIG. 8, may be used which has a flat end 19' which abuts the outer surface of protruding section 29 of removable member 16. In such applications, the length of the mounting pin 18' (FIG. 8) should be shorter than the length of the mounting pin 18 (FIG. 7) so as to provide a tight abutting contact at each end of the mounting pin. With the removable member 16 inserted into slot 21 of housing 15, the outwardly extending section 33 of spring catch 30 extends into elongated opening 22 such that the end 34 of section 33 is positioned adjacent edge or surface area 23 of housing 15, which prevents the removable member from moving out of slot 21. After insertion of removable member 16 into slot 21, the cap screw 36 is threaded into opening 35 in member 16 and securely tightened against the inner surface of slot 21 which forces member 16 against an inner surface of housing 15 which defines slot 21, thus preventing member 16 from any unnecessary wear of spring catch 30 and surface 23 due to machine vibration. This provides an added safety feature in case section 33 of spring catch 30 is accidentally depressed to enable member 16 to slide out of slot 21. To remove the removable member 16, the cap screw 36 is removed, the section 33 of catch spring 30 is depressed, and a tool is inserted into groove 20' to contact the curved end 25 of member 16 and move it outwardly through slot 21, whereby the protruding section 29 of member 16 is removed from the groove 37 in pin end 18, where used, and mounting pin may be withdrawn through the openings in housing 15.

Referring now to the embodiment illustrated in FIGS. 9–14, only a mounting pin having a groove in the end, similar to FIG. 7, is shown, but a mounting pin of the type of FIG. 8 may be utilized in this embodiment. As shown in the embodiment of FIGS. 9–14, a mounting pin 40 having an end 41 with a groove 42 (shown in FIGS. 10 and 13) is retained in a retention mechanism 10' having a housing 43 (FIGS. 9 and 12A–12B) and a removable key or member 44 (FIGS. 11A–11B and 14). The housing 43 includes an annular opening 45, a transverse opening, keyway, or slot 46, and an elongated opening 47, the slot or transverse opening 46 being constructed to receive the removable key or member 44. Housing 43 is also provided with a groove 48–48' which is centered in the keyway or slot 46, and a pair of notches or tapered grooves 49 located centrally along the sides of slot 46, as seen more clearly in FIG. 12A. As in the housing 15 of the FIGS. 2–8 embodiment, the housing 43 may be constructed of two sections, one section, shown in FIG. 12B having elongated opening 47 formed therein and the other section, shown in FIG. 12A, having the openings 45 and 46, grooves 48–48' and notches 49 formed therein, after which the two sections, FIGS. 12A and 12B are secured together, as by welding, to produce the housing 43 of FIG. 9. Slot 46 is provided with tapered end sections 50 at each end to enable ease of entry of the removable key or member 44 into the keyway or slot 46.

The removable key or member 44 includes an inner body section 51 and an outer section 52 which curves around body section 51 and is integral therewith at one end and spaced therefrom along the length as indicated at 53. The outer body section 52 is provided with a protruding area 54 adapted to cooperate with a notch 49 of housing 43, with outer body section 52 serving as a spring catch to retain protruding area 54 in a notch 49, thereby maintaining the removable key or member 44 in housing 43. Body section 51 of member 44 includes a protruding area 55 along the length thereof, see FIG. 11B, which defines a key which moves through groove 48, slot 42 in pin 40, and groove 48' when member 44 is inserted into housing 43. Body section 51 also includes a notch 56 in an outer end, which corresponds to a notch 57 in housing 43, and by which the member 44 is driven through the slot 46. Note that the configuration of the outer surface 58 of housing 43 generally corresponds to that of the removable member or key 44, as seen in FIGS. 9 and 12B. The shape of housing 43 is to provide a guard for key 44 from being accidentally knocked out of housing 43 by some foreign object.

In operation, the removable key or member 44 is inserted into slot 46 in housing 43 such that protruding area 54 is located in a notch 49. As member 44 is moved into slot 46, outer section 52 of member 44 depressed into space 53 allowing protruding area 54 to pass through slot 46 into notch 49 whereby the member 44 is retained in housing 43. As member 44 is inserted into slot 46, the protruding section or key 55 passes through groove 48, groove 42 in pin 40 and groove 48', whereby the pin 40 is prevented from rotational movement due to the key 55 in groove 42, and is prevented from longitudinal movement by the removable member 44. Removal of the member 44 from slot 46 is accomplished by driving the member 44 through the slot 46, such as by placing a tool in the notch 56 and forcing, as by a hammer, to punch the member 44 entirely through the slot 46. For added safety, the removable member 44 may be provided with a cap screw, such as cap screw 36 of FIG. 2.

It has thus been shown that the present invention provides a retention mechanism for a mounting pin which is easily installed and quickly removed. By the use of a removable member having a spring catch, the mounting pin can be easily and quickly removed and/or replaced, and securely retained, by the retention mechanism of this invention. The invention can be utilized for various applications from heavy equipment uses to light equipment applications.

While particular embodiments of the invention have been illustrated and described, such are not intended to be limiting. Modifications and changes may become apparent to those skilled in the art, and it is intended that the invention be limited only by the scope of the appended claims.

What is claimed is:

1. A retention mechanism for a pin, comprising:
    a housing having a plurality of openings therein,
    a removable member adapted to be removably mounted in said housing, and
    a spring catch arrangement on said removable member for retaining said removable member in said housing and enabling removal of said removable member from said housing,
    said spring catch arrangement being located on a face surface of said removable member and including an outwardly extending section adapted to abut a surface defining one of said plurality of openings for preventing removal of said removable member,
    said plurality of openings in said housing comprising:
        a first opening of an annular configuration,
        a second opening defining a slot and extending transverse to said first openings, and
        a third opening having an elongated configuration, and wherein said removable member is adapted to be removably located in said second opening.

2. The retention mechanism of claim 1, wherein said housing includes a groove extending adjacent one of said plurality of openings and transverse to another of said plurality of openings, and wherein said removable member includes a projecting section adapted to move in and cooperate with said groove in said housing.

3. The retention mechanism of claim 2, wherein said one of said plurality of openings extends transversely past said another of said plurality of openings.

4. The retention mechanism of claim 2, wherein said another of said plurality of openings in said housing is of an annular configuration and adapted to retain an end of an associated pin.

5. The retention mechanism of claim 4, wherein said removable member is positioned closely adjacent an inner end of said annular configured opening so as to prevent longitudinal movement of an associated pin having an end adapted to be retained in said annular configured opening.

6. The retention mechanism of claim 2, in combination with a pin having a groove in an end thereof, whereby said projecting section of said removable member extends into said groove in said pin and prevents rotation of and longitudinal movement of said pin.

7. The combination of claim 6, wherein said pin comprises a mounting pin for pivotably interconnecting an apparatus with an attachment.

8. The retention mechanism of claim 1, wherein said third opening includes a surface adapted to be located adjacent said spring catch arrangement when said removable member is inserted into said second opening.

9. The retention mechanism of claim 1, wherein said second opening extends transversely across said first opening and includes tapered surfaces.

10. The retention mechanism of claim 9, wherein said removable member includes tapered surfaces which cooperate with tapered surfaces of said second opening.

11. The retention mechanism of claim 10, wherein said spring catch arrangement is located on a face surface of said removable member intermediate said tapered surfaces, and includes an outwardly extending section adapted to abut a surface defining said third opening for preventing removal of said removable member from said second opening.

12. The retention mechanism of claim 11, wherein said face surface of said removable member is provided with a removable means to further prevent movement of said removable member after being inserted into said one opening.

13. A retention mechanism for a pin, comprising:

a housing having a plurality of openings therein, one of said plurality of openings extending transversely and entirely through said housing, a removable member adapted to be removably mounted in said one of said plurality of openings in said housing, and a spring catch arrangement integral with said removable member for retaining said removable member in said housing and enabling removal of said removable member from said housing, said plurality of openings in said housing comprising:
a first opening of an annular configuration,
a second opening, comprising said one of said plurality of openings, defining a slot and extending transverse to said first opening, and
a third opening having an elongated configuration, and wherein said removable member is adapted to be removably located in said second opening.

14. The retention mechanism of claim 13, wherein said removable member consists of a single member which includes an inner body section and an outer section secured at one end to said inner body section, and comprises a portion of said spring catch arrangement, said outer section being provided with a protruding area adapted to be inserted into at least one notch located in said housing adjacent one of said plurality of openings into which said removable member is adapted to be inserted.

15. The retention mechanism of claim 14, wherein said one of said plurality of openings extends entirely through said housing, and wherein said removable member is constructed to enter one end of said one of said plurality of openings for retaining an associated pin in said housing and is removed from said one of said plurality of openings via an opposite end thereof.

16. The retention mechanism of claim 13, wherein said second opening extends entirely through said housing.

17. In a piece of equipment having a boom and a replaceable tool removable mounted to said boom by a plurality of pins, the improvement comprising:

a pin retention mechanism comprising:
a housing having a plurality of openings therein,
a removable member adapted to be removably mounted in one of said plurality of openings in said housing, and
a spring catch arrangement on said removable member for retaining said removable member in said housing and enabling removal of said removable member from said housing,
said spring catch arrangement being selected from the group consisting of a member mounted on a face surface of said removable member and a member integral with said removable member,
said plurality of openings in said housing comprising:
a first opening of an annular configuration,
a second opening, comprising said one of said plurality of openings, defining a slot and extending transverse to said first opening, and
a third opening having an elongated configuration, and
wherein said removable member is adapted to be removably located in said second opening.

* * * * *